PHONOGRAPH WITH AIR HOSE FOR CLEANING RECORDS

Original Filed June 7, 1961

2 Sheets-Sheet 1

INVENTORS:
HARWOOD B. MOORE,
YATES M. HOAG,
DANIEL C. OSBORN, III

BY Norman C. Fulmer
THEIR ATTORNEY.

INVENTORS:
HARWOOD B. MOORE,
YATES M. HOAG,
DANIEL C. OSBORN, III

BY Norman C. Fulmer
THEIR ATTORNEY.

3,313,548

PHONOGRAPH WITH AIR HOSE FOR CLEANING RECORDS

Harwood B. Moore, Sauquoit, Yates M. Hoag, Utica, and Daniel C. Osborn, III, Syracuse, N.Y., assignors to General Electric Company, a corporation of New York Continuation of application Ser. No. 115,440, June 7, 1961. This application July 10, 1964, Ser. No. 382,694
9 Claims. (Cl. 274—47)

This application is a continuation of our co-pending application Ser. No. 115,440, filed June 7, 1961, for Phonograph With Air Hose for Cleaning Records, now abandoned.

This invention relates to phonographs having a tone arm equipped with an air hose through which air is sucked or blown to remove dust from a record being played. More particularly, the invention relates to a new and improved arrangement for bringing the air hose out from the tone arm and leading it to an air pump.

It would seem that an air hose could be brought out of a tone arm downwardly through or near the pivot post, similar to the manner in which the pickup cartridge lead wires are conventionally brought down from a tone arm. However, it is found that such an arrangement is unsatisfactory because the air hose must have a sufficient cross-sectional size to permit adequate air flow, and even if the hose is as light and flexible as feasible for the required size, it has sufficient stiffness and weight to cause a drag on the motion of the tone arm as it moves across a record being played. Furthermore, such an air hose causes uneven and improper stylus pressure of the playback stylus on the record groove. Any tone arm drag or improper stylus pressure caused by the air hose may result in distorted sound reproduction, and can shorten the life of records and of the playback needle. These problems are particularly severe when the stylus pressure is relatively light, for example less than ten grams, as is customary for high fidelity and stereophonic phonographs.

An object of the invention is to provide a phonograph with an improved arrangement of an air hose for removing dust from records being played.

Another object is to provide a phonograph air hose arrangement having reduced effect on the tone arm movement.

A further object is to provide a phonograph air hose arrangement having reduced effect on the stylus pressure of the playback needle.

Other objects will be apparent from the following description and claims, and from the drawing in which:

Figure 1:
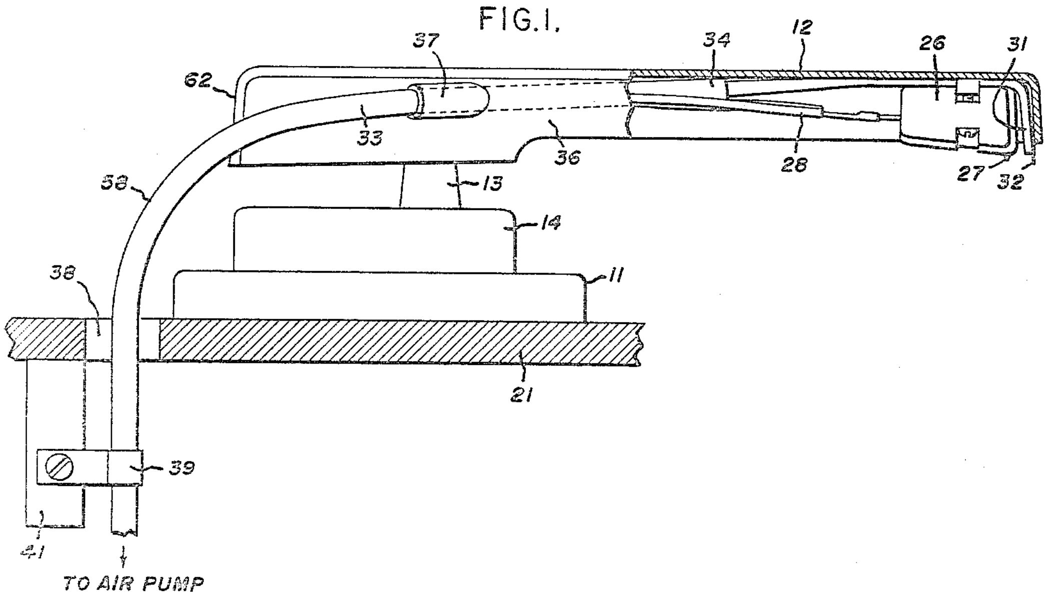
FIG. 1 is a side view of a phonograph tone arm and air hose arrangement in accordance with a preferred embodiment of the invention, the tone arm being partly broken away to reveal interior construction.

The invention comprises, in its basic preferred embodiment, a phonograph having a tone arm equipped with an air hose for removing dust from records; this air hose, after leaving the tone arm at a point near the tone arm pivot, is free from external support to a point where it is supported behind and below its point of exit from the tone arm. Preferably, the air hose extends backwardly from its point of exit from the tone arm, then bends downwardly, to provide two mutually perpendicular segments for greater flexibility. Various modifications of this preferred arrangement will be described.

In the preferred embodiment of the invention shown in the drawing, a record player is provided with a frame or mounting base 11, to which a tone arm 12 is pivotally attached by means of a pivot post 13 extending vertically between the tone arm 12 and a pedestal 14 carried by the base 11. The tone arm 12 is pivoted at the post 13 for horizontal movement, and may also be pivoted at or near the post 13 for vertical movement. Usually the vertical pivoting is at a point behind the horizontal pivoting. A phonograph record 16 is carried by a conventional turntable (not shown) which is adapted to be rotated by means of a turntable motor, in the known manner. The center hole of the record fits over a spindle 17 which extends upwardly from the center of the turntable. The record 16 is provided with a continuous spiral groove 18. A record stabilizer bar 19, of which only a part is shown, is adapted to fit over a stack of records in the conventional manner if the record player is of the automatic record changer type. A tone arm rest 20 extends upwardly from the base 11, for supporting the tone arm 12 when in rest, i.e., non-playing position. The record player base 11 may be attached to a shelf 21, which may be the top surface of a supporting base, or may be a shelf within a cabinet for housing the record player.

The tone arm 12 carries, near its front end, a phonograph pickup cartridge 26 provided with a playback needle or stylus 27 adapted to engage the groove 18 of the phonograph record 16. Lead wires 28 are attached to the cartridge 26, and extend to an amplifier in any suitable manner. An air nozzle 31, of hollow configuration to provide a channel for air flow, is carried by the tone arm 12 so that the extremity thereof is near the stylus 27. A brush 32 is carried by the nozzle 31, and extends downwardly therefrom to engage the surface of a record 16, in order to loosen dust from the groove 18. An air hose 33 is attached at one end thereof to the nozzle 31, as indicated at 34. The hose 33 is made from flexible material, such as rubber or plastic, and may have an inside diameter of ¼ of an inch, for example. The material and thickness of the hose, while providing flexibility, must at the same time provide adequate strength and stiffness so that the hose will retain its shape when air is blown or sucked therethrough. The air hose 33 is brought out of the tone arm 12 through an opening in the inner side wall 36 thereof, near the pivot post 13. Preferably, a bushing 37, which may be an integral part of the tone arm 12, is provided at this location of the inner side wall near the pivot post 13, to orient the air hose 33 so that it extends backwardly with respect to the tone arm 12 when it emerges from the bushing 37. Alternatively, the nozzle 31, or other suitable air-carrying channel or hose, could terminate at the bushing 37, and the flexible hose 33 could be fitted over or otherwise suitably attached to the bushing 37 so as to be carried by, and emerge or exit from, the tone arm at this point.

The air hose 33 extends backwardly from the bushing 37 and thence downwardly through an opening 38 in the shelf 21. Preferably, the opening 38 is an elongated slot oriented perpendicularly to the general axis of the tone arm 12, as shown. The air hose 33 is supported by a clamp 39, below the shelf 21. The clamp 39 may be carried by a post 41 extending downwardly from the shelf 21. The clamp 39 is fixedly positioned below the center of the opening or slot 38. The hose 33, below the clamp 39, is attached to the inlet 46 of an air pump 44. The air pump 44 preferably is a vacuum pump, for sucking air through the hose 33, thereby applying suction or a vacuum at the nozzle 31 for sucking dust from the phonograph record surface. It desired, however, the air pump 44 could be a blower for blowing air through the hose 33 and nozzle 31 to blow dust away from the record near the needle 27.

Figure 2:
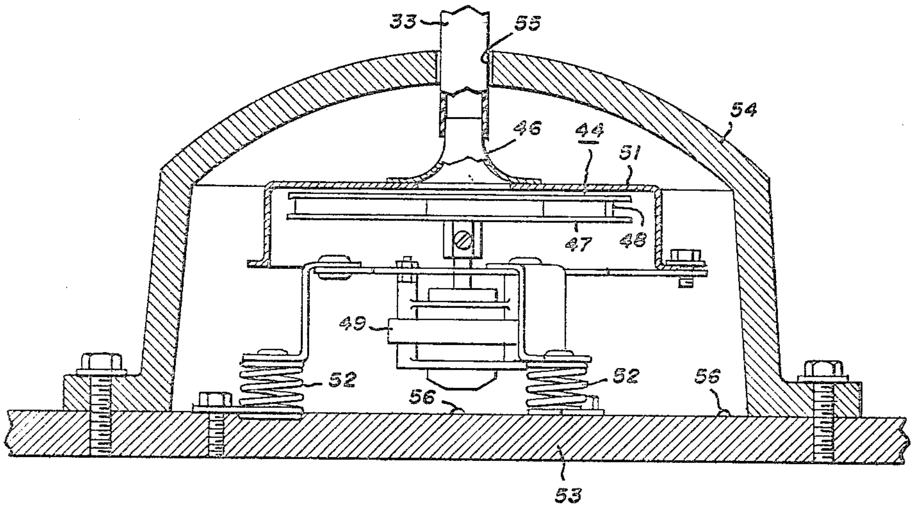
FIG. 2 is a cross-sectional view of a suitable air pump for sucking air through the air hose in order to create a vacuum at the surface of a phonograph record near the playback needle.

As shown in FIG. 2, the air pump 44 may comprise an impeller 47 provided with vanes 48, the center of the impeller 47 being hollow and positioned in alignment with the inlet 46. A bracket 51, which may be in the form of an inverted cup-shaped housing, may be provided over the impeller 47 for supporting the inlet 46. The impeller 47 is rotated by means of a motor 49, and the rotating impeller 47 sucks air into the inlet 46 and discharges it at the periphery of the impeller. Dust expelled from the impeller 47 settles downwardly. The motor 49 and air pump 44 may be supported by means of springs 52, on a shelf 53 or bottom of a cabinet. An acoustic housing 54 may be provided over the air pump 44. The acoustic housing 54 is provided with an opening 55 through which the air hose 33 passes. Openings 56 may be provided through the housing 54 to facilitate the flow of air. The housing 54 may be made from any suitable sound absorbing material, such as papier maché or plastic. The air pump 44 could be located so that the inlet 46, or the opening 55 in the housing 54, will take the place of the bracket 39.

As shown in FIG. 1, the air hose extends rearwardly from the tone arm bushing 37, and then curves downwardly, as indicated at 58, to where it is held by the bracket 39. This arrangement, with sufficient length of hose (six inches, for example) between the bushing 37 and bracket 39, provides adequate flexibility of the air hose 33 in all directions required for proper functioning of the record player, thus preventing any undesired amount of drag on the tone arm 12 or improper stylus pressure at the needle 27. The improved flexibility of the hose is largely due to its bent shape which provides two mutually perpendicular segments, for easy flexing in all directions. Each of these segments should be sufficiently long to cooperatively provide the required flexing. The segments may be of equal length, or may be unequal up to an extent before the flexibility becomes inadequate. While the hose is flexible, it is also stiff enough to be self-supporting, so as not to flop over between the bushing 37 and the bracket 39.

Figure 3:
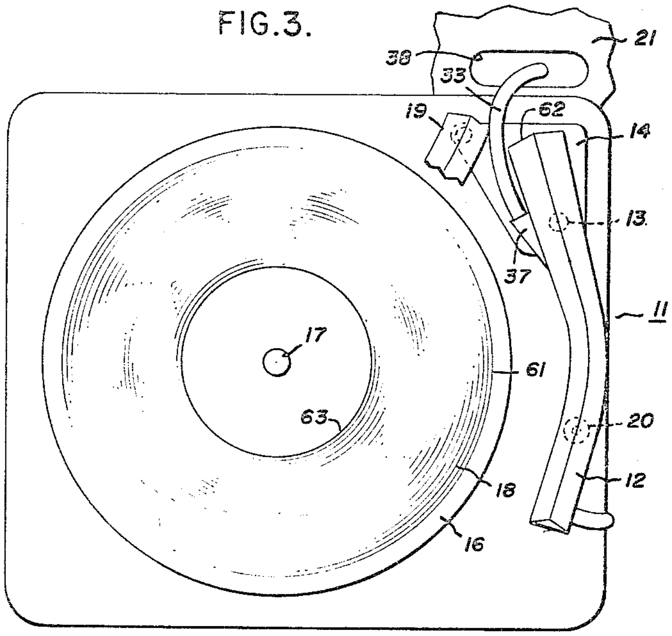
FIG. 3 is a top view of a record player in accordance with the invention, with the tone arm at rest position.

The air hose support bracket 39 is positioned, relative to the tone arm 12, so that when the tone arm 12 is positioned with the stylus 27 in the outermost portion 61 of the record groove 18, the air hose 33 will be free from engagement with the rear end 62 of the tone arm 12 which extends to the rear of the bushing 37. Thus, the air hose 33 will be free of engagement with the rear of the tone arm during the playing of records. Preferably, the bracket 39 is furthermore positioned so that the air hose 33 will be free from engagement with the rear end 62 of the tone arm 12 when the tone arm 12 is in its rest position, as indicated in FIG. 3.

Figure 4:
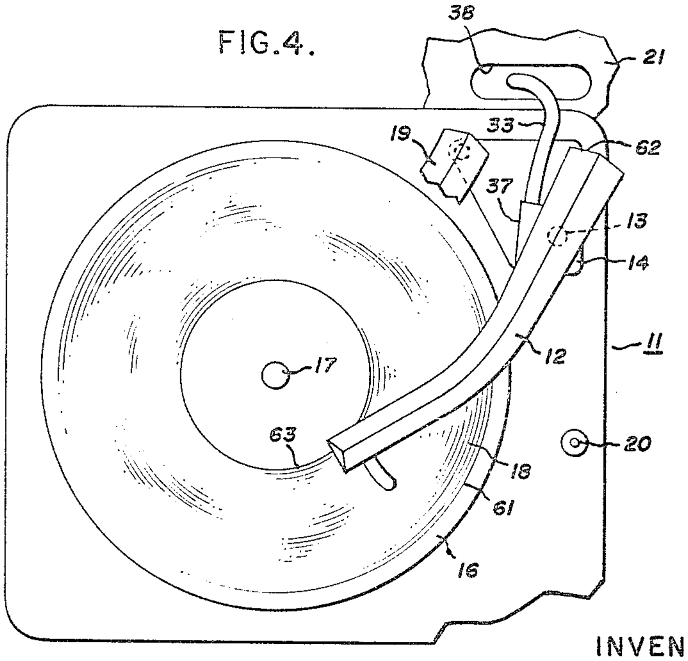
FIG. 4 is a top view of a record player in accordance with the invention, with the tone arm at the inner portion of the record groove.

The slot 38 is sufficiently long, and is so positioned, that the air hose 33 does not engage either the left end of the slot when the tone arm 12 is positioned for the stylus 27 to engage the outermost portion 61 of the record groove 18, nor the right end of the slot when the tone arm 12 is positioned so that the stylus 27 engages the innermost portion 63 of the groove 18 as shown in FIG. 4. Preferably, the slot 38 is furthermore positioned so that the air hose 33 does not engage the left end thereof when the tone arm 12 is in its rest position, as shown in FIG. 3.

It has been found that the invention provides a useful and feasible solution to the problem or arranging a phonograph air hose so as to reduce or minimize undesirable effects of the air hose on the tone arm movement and the stylus pressure. The air hose 33 may, if desired, be brought out from the tone arm 12 at the opposite side from that shown in the drawing, or at the top or bottom of the tone arm, provided the principles of the invention, disclosed above, are followed.

While a preferred embodiment of the invention has been shown and described, other embodiments and modifications thereof will be apparent to those skilled in the art, and will fall within the scope of invention as defined in the following claims.

What we claim is:

1. In a phonograph having a turntable and an elongated tone arm with an air hose arranged in the tone arm for removing dust from a record being played, said tone arm being provided at the front end thereof with a cartridge carrying a stylus, and pivoted so that the stylus can traverse the groove of a disc record carried on the turntable, the improved arrangement comprising means for separating said air hose from contact with said tone arm at a region adjacent to the rear of said tone arm, said separating means directing said air hose rearwardly from said region, and means for supporting said air hose at a location behind and below said region, said air hose extending rearwardly of said region and then downwardly to said supporting means, thereby to provide flexibility of said air hose during movement of said tone arm and reducing drag on said tone arm.

2. An arrangement as claimed in claim 1, in which said region of the tone arm is near said tone arm pivot.

3. An arrangement as claimed in claim 1, in which said phonograph is carried on a shelf, said means for supporting the air hose being located beneath said shelf, and said shelf being provided with an opening through which said air hose passes freely, said opening comprising a slot oriented perpendicularly to the general axis of said tone arm, said slot being sufficiently long so that said air hose does not engage the ends thereof during the playing of a record.

4. An arrangement as claimed in claim 2, in which said region of the tone arm is at the side of the tone arm nearest said turntable.

5. An arrangement as claimed in claim 2, in which said region of the tone arm is at a side thereof, and in which said tone arm extends rearwardly of said tone arm region, said air hose supporting means being located relative to the tone arm so that said air hose is free from contact with said rearwardly extending part of the tone arm during the playing of a record.

6. An arrangement for removing dust from a phonograph record, comprising an elongated tone arm having a front and rear thereof, an air hose disposed within said tone arm and extending in the direction between the front and rear thereof, said tone arm having an opening therein through which said air hose exits from the tone arm, said opening being disposed adjacent the rear of said arm and having support means for directing said air hose away from said tone arm and toward the rear of the tone arm upon exiting therefrom, thereby reducing the possibility of drag effect upon said arm by said air hose.

7. A phonograph comprising an elongated tone arm for carrying a pick-up cartridge at the front end thereof, said tone arm being equipped therein with an air hose which exits therefrom at a region substantially to the rear of said front end, means for directing said air hose away from said tone arm and rearwardly of said tone arm from said exiting region, and support means for said air hose located substantially behind and below the region of exit of the air hose from the tone arm, said air hose being free from external support between said region of exit and said support means, thereby reducing drag imparted to said tone arm by said air hose.

8. A phonograph comprising an elongated tone arm for carrying a pick-up cartridge at the front end thereof and equipped therein with an air hose which exits therefrom at a region substantially to the rear of said front end, means for directing said air hose away from said tone arm and rearwardly of said tone arm from said exiting region, and support means for said air hose located at a position diagonally offset from the region of exit of the air hose from the tone arm, said air hose being free from external support between said region of exit and said support means, and being bent between said region of exit and said support means to provide two mutually perpendicular segments thereof.

9. In a phonograph having a turntable and an elongated tone arm provided at the front end thereof with a cartridge carrying a stylus, said tone arm being pivoted so the stylus can traverse the groove of a disc-shaped record carried on the turntable and said tone arm being equipped with an air hose for removing dust from a record while the record is being played, the improved arrangement comprising first means disposed adjacent the rear of said tone arm for separating the air hose from contact with the tone arm, said first means directing the air hose toward the rear of the tone arm, and second means for supporting said air hose at a location behind and below said first means, said air hose extending rearwardly of said first means and then downwardly to said second means, thereby to provide flexibility of said air hose during movement of said tone arm and reducing the possibility of drag effect upon said arm by said air hose.

References Cited by the Examiner

UNITED STATES PATENTS 2,509,307 5/1950 Madera ------------- 274—47

NORTON ANSHER, *Primary Examiner.*

J. F. PETERS, C. B. PRICE, *Assistant Examiners.*